US010668840B2

(12) United States Patent
Lombardi et al.

(10) Patent No.: US 10,668,840 B2
(45) Date of Patent: Jun. 2, 2020

(54) ELASTOMERIC UPHOLSTERY PIPING

(71) Applicant: GM Global Technology Operations LLC, Detroit, MI (US)

(72) Inventors: Joseph Lombardi, Royal Oak, MI (US); Matthew B. Erdey, Royal Oak, MI (US); Danny J. Lombardi, Clinton Township, MI (US); Nicholas Rosinski, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 15/964,938

(22) Filed: Apr. 27, 2018

(65) Prior Publication Data

US 2019/0329684 A1 Oct. 31, 2019

(51) Int. Cl.
*B68G 7/10* (2006.01)
*B60N 2/58* (2006.01)
*B68G 11/00* (2006.01)
*A47C 27/00* (2006.01)

(52) U.S. Cl.
CPC ............ *B60N 2/5816* (2013.01); *B68G 11/00* (2013.01); *A47C 27/003* (2013.01); *B68G 7/105* (2013.01); *Y10T 428/19* (2015.01); *Y10T 428/192* (2015.01); *Y10T 428/197* (2015.01)

(58) Field of Classification Search
CPC .............. Y10T 428/19; Y10T 428/192; Y10T 428/197; B68G 7/105; B68G 7/12; A47C 27/003
See application file for complete search history.

(56) References Cited

U.S. PATENT DOCUMENTS 2,347,158 A * 4/1944 Spraragen ............ B68G 7/105
49/479.1
2,855,027 A * 10/1958 Bank ..................... B68G 7/105
428/123
5,565,159 A * 10/1996 Cykana .................. B29C 48/07
264/177.19

FOREIGN PATENT DOCUMENTS

FR 740585 * 1/1933

* cited by examiner

*Primary Examiner* — Alexander S Thomas

(57) ABSTRACT

An upholstery piping component for a vehicle seat includes an elongated anchor and an elongated projection. The elongated anchor is formed from an elastomeric material. The elongated anchor extends along a length. The elongated anchor is configured to be coupled to a first upholstery portion and a second upholstery portion and disposed between the first upholstery portion and the second upholstery portion. The elongated projection is formed from the elastomeric material. The elongated projection is integrally is formed with the elongated anchor. The elongated projection extends from the elongated anchor for at least a portion of the length. The elongated projection is configured to at least partially conceal a seam between the first upholstery portion and the second upholstery portion. The elastomeric material is flexible such that the upholstery piping component is configured to move between a neutral configuration and a modified configuration.

15 Claims, 5 Drawing Sheets

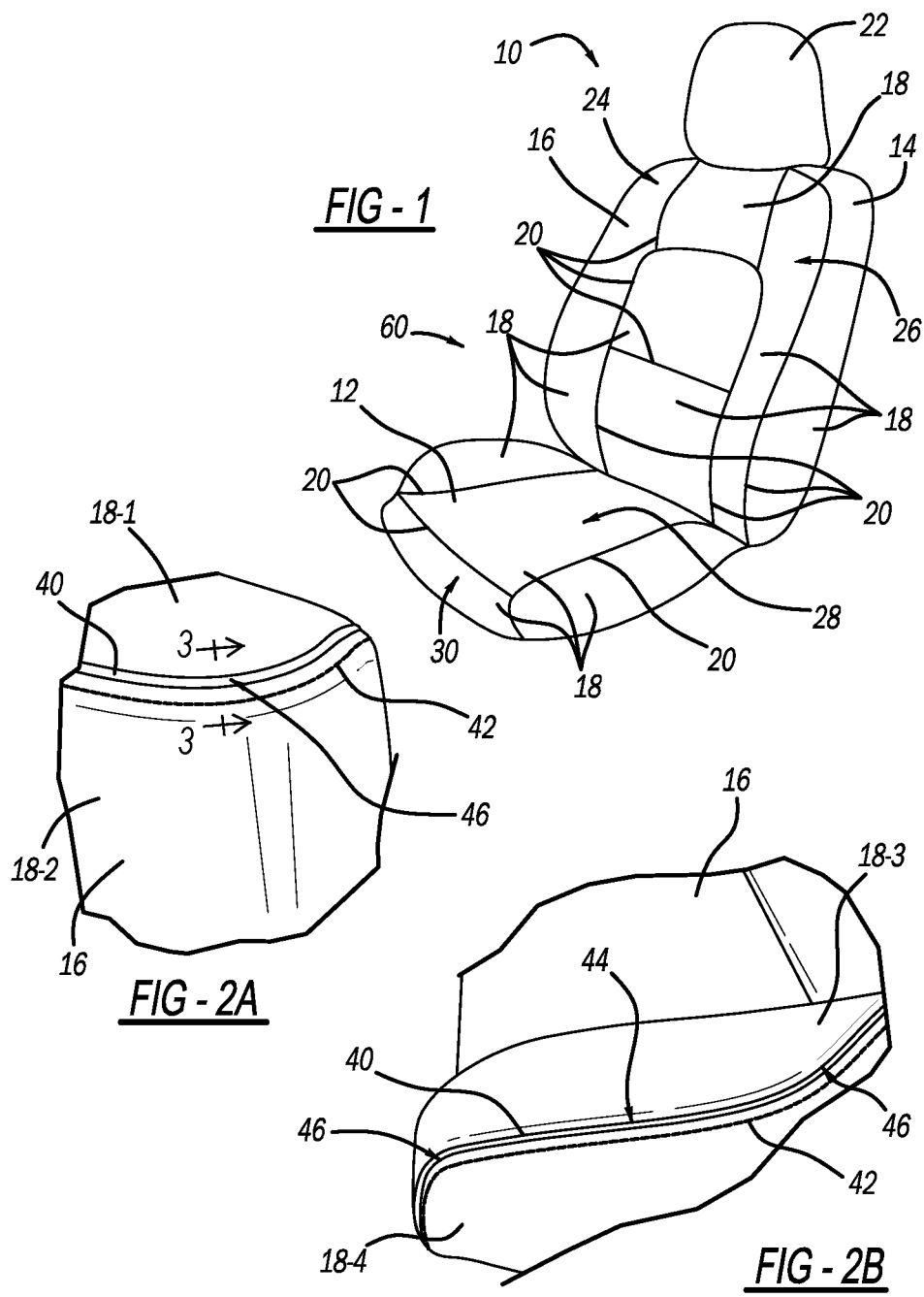

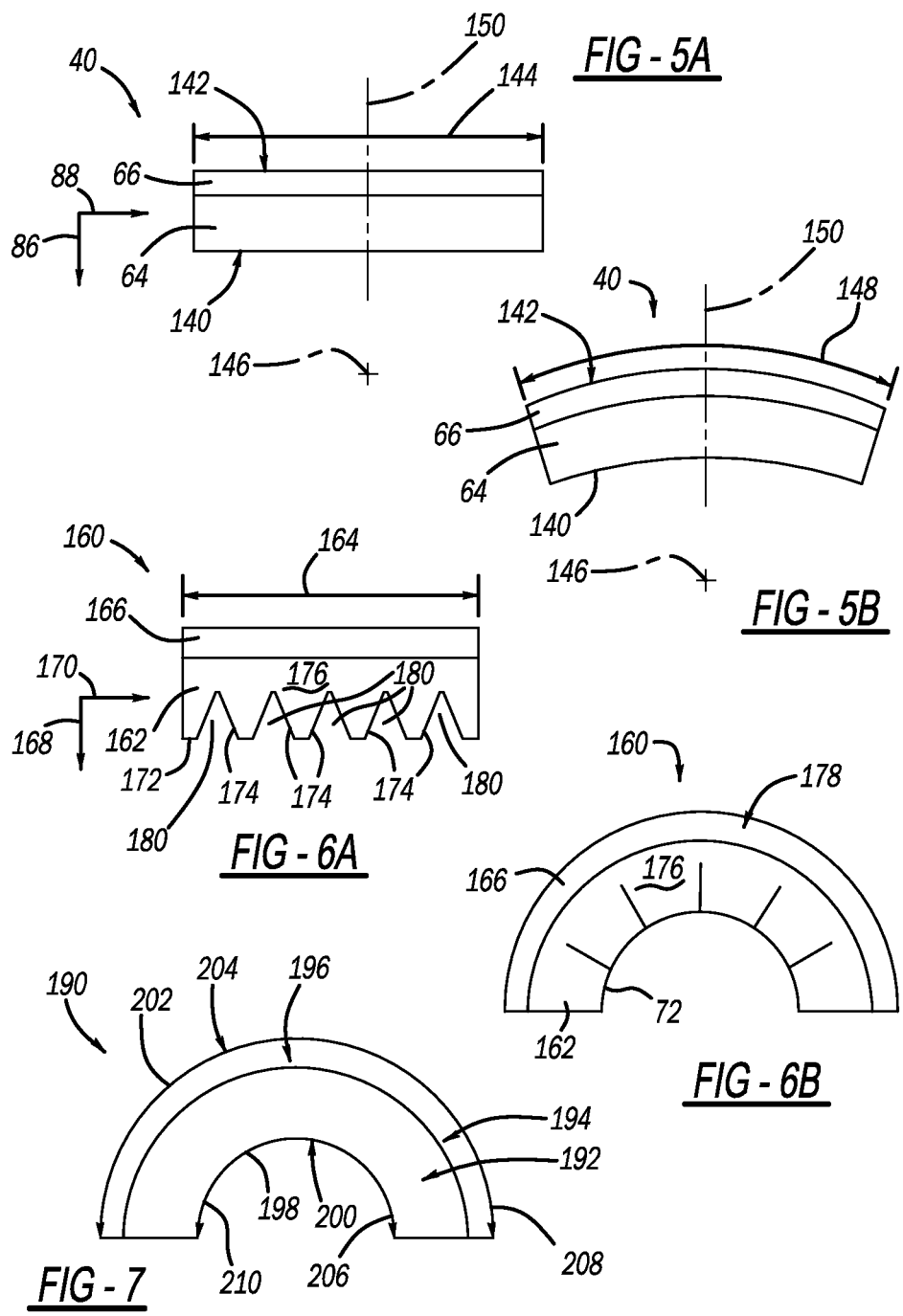

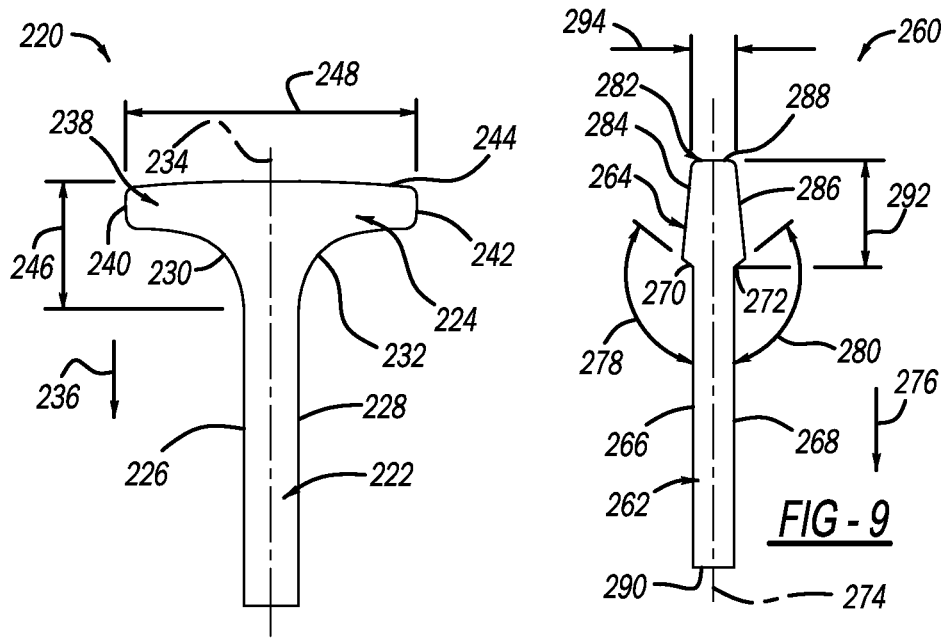
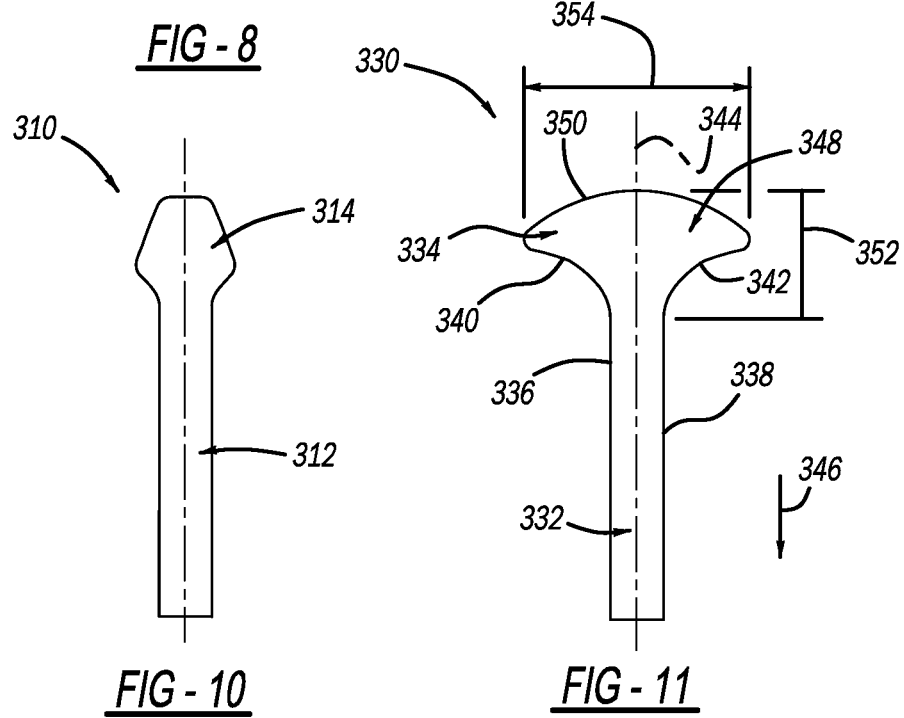

US 10,668,840 B2

ELASTOMERIC UPHOLSTERY PIPING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to elastomeric upholstery piping, vehicle seats including the elastomeric upholstery piping, and methods of manufacturing the elastomeric upholstery piping.

A vehicle seat may generally include a support frame, foam components, and an upholstery cover to at least partially conceal the support frame and foam components. Some vehicle seats include trim components, such as upholstery piping. Upholstery piping is used to conceal seams in the upholstery cover and provide an aesthetically-pleasing finished appearance.

SUMMARY

In various aspects, the present disclosure provides an upholstery piping component for a seat of a vehicle. The upholstery piping component includes an elongated anchor and an elongated projection. The elongated anchor is formed from an elastomeric material. The elongated anchor extends along a length. The elongated anchor is configured to be coupled to a first upholstery portion and a second upholstery portion and disposed between the first upholstery portion and the second upholstery portion. The elongated projection is formed from the elastomeric material. The elongated projection is integrally is formed with the elongated anchor. The elongated projection extends from the elongated anchor for at least a portion of the length. The elongated projection is configured to at least partially conceal a seam between the first upholstery portion and the second upholstery portion. The elastomeric material is flexible such that the upholstery piping component is configured to move between a neutral configuration and a modified configuration.

In one aspect, the elongated anchor extends from a first end to a second end in a first direction. The elongated projection is disposed along the first end. The length defines a second direction. The second direction is perpendicular to the first direction when the upholstery piping component is in the neutral configuration.

In one aspect, the upholstery piping component is configured to move from the neutral configuration to the modified configuration in response to a force applied in the first direction.

In one aspect, the elongated projection is configured to stretch from a first dimension to a second dimension when the upholstery piping component moves from the neutral configuration to the modified configuration. The second dimension is greater than the first dimension.

In one aspect, the elongated anchor defines a proximal surface. The proximal surface is disposed at the second end. The proximal surface extends in the second direction and a third direction. The third direction is perpendicular to the first direction and the second direction when the upholstery piping component is in the neutral configuration. The proximal surface defines a plurality of notches. Each notch extends toward the first end of the elongated anchor. A volume of each notch is configured to decrease when the upholstery piping component moves from the neutral configuration to the modified configuration.

In one aspect, each notch of the plurality of notches defines a triangular cross section in the third direction.

In one aspect, the elongated anchor includes a first side surface and a second side surface. The second side surface is disposed opposite the first side surface. Each of the first side surface and the second side surface extends between the first end and the second end, and along the length.

In one aspect, the elongated anchor defines a center plane equidistant between the first side surface and the second side surface when the upholstery piping component is in the neutral configuration. The elongated projection includes a third side surface and a fourth side surface. The third side surface extends from the first side surface at the first end of the elongated anchor. The third side surface extends toward the center plane in the first direction. The fourth side surface extends from the second side surface at the first end of the elongated anchor. The fourth side surface extends toward the center plane in the first direction.

In one aspect, the first side surface and the third side surface define a first angle. The second side surface and the fourth side surface define a second angle. The first angle and the second angle are each greater than 90° and less than 180°.

In one aspect, the first angle and the second angle are each greater than 140° and less than 150°.

In one aspect, the third side surface and the fourth side surface are each concave.

In one aspect, in the neutral configuration, the upholstery piping component is symmetric about the center plane.

In one aspect, in the modified configuration, the upholstery piping component defines a radius of curvature of less than 60 mm.

In one aspect, the radius of curvature is less than or equal to 40 mm.

In one aspect, the elongated projection includes a top surface defining a texture.

In one aspect, the elongated projection extends along the entire length of the elongated anchor.

In various other aspects, the present disclosure provides an upholstery piping component for a seat of a vehicle. The upholstery piping component includes an elongated anchor and an elongated projection. The elongated anchor is formed from an elastomeric material. The elongated anchor extends along a length. The elongated anchor is configured to be coupled to a first upholstery portion and a second upholstery portion and disposed between the first upholstery portion and the second upholstery portion. The elongated projection is formed from the elastomeric material. The elongated projection is integrally formed with the elongated anchor. The elongated projection extends along a first end of the elongated anchor for at least a portion of the length. The elongated projection is configured to at least partially conceal a seam between the first upholstery portion and the second upholstery portion. The upholstery piping component defines a curved portion. The curved portion defines an inside arc at a second end of the elongated anchor opposite the first end and an outside arc at a distal end of the elongated projection.

In one aspect, the curved portion defines a radius of less than 60 mm.

In one aspect, the inside arc defines a proximal surface that is continuous.

In yet other aspects, the present disclosure provides a seat cover for a vehicle seat. The seat cover includes an upholstery component and an upholstery piping component. The upholstery component includes a first portion and a second portion. The upholstery piping component is coupled to the first portion and the second portion and disposed between the first portion and the second portion. The upholstery piping component is formed from an elastomeric material. The upholstery piping component includes an elongated anchor and an elongated projection. The elongated anchor extends along a length. The elongated projection is integrally formed with the elongated anchor. The elongated projection extends from the elongated anchor for at least a portion of the length. The elongated projection is configured to at least partially conceal a seam between the first portion of the upholstery component and the second portion of the upholstery component when the seat cover is coupled to the vehicle seat.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is an isometric view of a vehicle seat according to certain aspects of the present disclosure;

FIGS. 2A-2B are an isometric views of portions of the vehicle seat of FIG. 1, each including an upholstery piping component;

FIGS. 5A-5B are partial side views of the upholstery piping component of FIG. 2A; FIG. 5A shows the upholstery piping component in a neutral configuration; FIG. 5B shows the upholstery piping component in a modified configuration;

FIGS. 6A-6B are partial side views of another upholstery piping component according to certain aspects of the present disclosure; FIG. 6A shows the upholstery piping component in a neutral configuration; FIG. 6B shows the upholstery piping component in a modified configuration;

FIG. 7 is a partial side view of yet another upholstery piping component according to certain aspects of the present disclosure, the upholstery piping component being in a neutral configuration;

FIGS. 8-13 are side views of alternative upholstery piping components according to certain aspects of the present disclosure, each upholstery piping component having a different cross section perpendicular to a length.

In the drawings, reference numbers may be reused to identify similar and/or identical elements.

DETAILED DESCRIPTION

Figure 3:
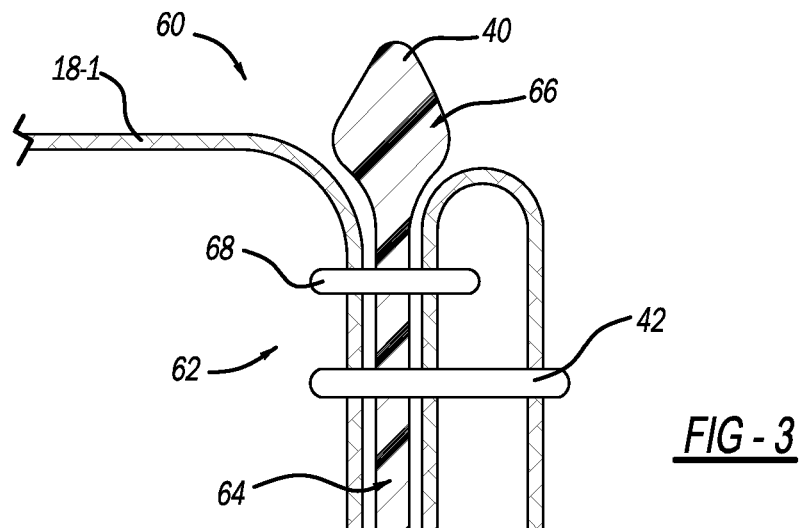
FIG. 3 is a sectional view of the portion of the vehicle seat of FIG. 2A, taken at line 3-3 of FIG. 2A.

As discussed above, some vehicle seat covers include upholstery piping to create an aesthetically-pleasing or finished appearance. Upholstery piping typically includes an elongated cylindrical core, such as a plastic cord, and an upholstery (e.g., vinyl or leather) cover. The plastic cord provides stiffness and structure to the upholstery piping component. The plastic cord is completely enclosed within the upholstery cover. The upholstery cover includes leather or vinyl, depending on the seat cover material. The upholstery cover is wrapped tightly around the plastic cord and sewn to itself to form a tube in which the plastic cord is disposed. The plastic cord extends within the tube along one side of the seam and free edges of the upholstery extend along the other side of the seam, forming a seam allowance. To fix the upholstery piping component to a seat cover, the seam allowance is disposed between two upholstery piping components and sewn in place. The upholstery-wrapped plastic cord is visible from an outside of the cover and conceals the seam between the two upholstery portions. In various aspects, the upholstery-wrapped cord may be referred to as a wrapped piping component or welting.

The use of wrapped piping components presents several challenges, including a non-uniform appearance when fixed to upholstery, a limitation on a radius of curvature, and a time-intensive assembly process. When the welting is extended around a curve or bend, the seam allowance puckers and/or folds over onto itself. The excess material at the inside of the curve can create bulges that are visible from an outside of the upholstery cover. The puckering may also distort the wrapped cord, leading to a wavy appearance. Furthermore, in certain curve configurations, the upholstery cover may bunch around the plastic cord and therefore be visible from the outside of the seat. The puckered upholstery and the inelastic materials (i.e., the plastic cord and upholstery cover) make use of the welting around smaller-radius curves difficult or impossible. Thus, it is generally only feasible to use the welting around curves having radii greater than or equal to about 60 mm. To accommodate smaller-radius curves, notches may be cut into the seam allowance to reduce the material bulk. Finally, assembly of the welting may be time-consuming, with the upholstery cover being manually sewn around the plastic cord. When the welting is used for tighter curves, notches are typically hand cut as needed.

In various aspects, the present disclosure provides an elastomeric upholstery piping component. The elastomeric upholstery piping component may be a single, integrally-formed component. The elastomeric material is durable, flexible, and stretchable. Therefore, the upholstery piping component can readily be manipulated into curved shapes. Furthermore, the piping component can be stretched to have a uniform and taut appearance. A cross-sectional shape of the piping component can be tailored to include different shapes, sizes, and textures. The cross sectional shape can also be optimized to facilitate a simple and repeatable process of assembling the piping component to upholstery. The upholstery piping can be produced in high-volume manufacturing processes, such as extrusion and injection molding. When the piping component is manufactured in a molding process, complex shapes are possible, such as preformed curves and notches.

The upholstery piping component is formed from or includes an elastomeric material. Suitable elastomeric materials are both mechanically durable and can withstand prolonged exposure to sunlight. The elastomeric material may include silicone or polyurethane elastomers, by way of non-limiting examples.

Referring to FIG. 1, a vehicle seat 10 according to certain aspects of the present disclosure is provided. The vehicle seat 10 may include a support frame (not shown) and be disposed within a passenger cabin of a vehicle to support a passenger. The vehicle seat may include a cushion 12 and a back 14, each of which include foam components (not shown). A seat cover 16 may at least partially conceal the support frame and foam components. The seat cover 16 may be made up of one or more upholstery portions or pieces 18 (collectively referred to as an "upholstery component") that are fixed to one another at seams 20. The seat 10 may generally include a headrest 22, a shoulder portion 24, a back portion 26, a bottom portion 28, and a knee portion 30.

As best shown in FIGS. 2A-2B, the seat 10 further includes an upholstery piping component 40. The upholstery piping component 40 may be formed from or include an elastomeric material, as described above. The upholstery piping component 40 at least partially conceals the seams 20. The seat cover 16 includes a first row of stitching 42. The first row of stitching 42 may be visible from an outside of the seat 10. The first row of stitching 42 may extend parallel to the upholstery piping component 40.

FIG. 2A shows the upholstery piping component 40 coupled to and disposed between a first upholstery portion 18-1 and a second upholstery portion 18-2. FIG. 2B shows the upholstery piping component 40 coupled to and disposed between a third upholstery portion 18-3 and a fourth upholstery portion 18-4. When fixed to the seat cover 16, the upholstery piping component 40 may extend along straight portions 44 and curved portions 46, to accommodate the contours of the seat foam components. The seat cover 16 may include multiple upholstery piping components 40.

Only a portion of the upholstery piping component 40 is visible from an outside 60 of the seat 10. Another portion that is concealed is used to fix the upholstery piping component 40 to the upholstery pieces 18 and is disposed on an inside 62 (FIG. 3) of the seat cover 16. Referring to FIG. 3, a sectional view of the upholstery piping component 40 coupled to the first upholstery portion 18-1 and the second upholstery portion 18-2 is shown. The upholstery piping component 40 may include an elongated anchor 64 and an elongated projection 66. The elongated anchor 64 and the elongated projection 66 may each include the elastomeric material and may be integrally formed with one another.

The elongated anchor 64 is visible from the outside 60 of the seat cover 16 to at least partially conceal the seam 20. The elongated anchor 64 is disposed between the first and second upholstery portions 18-1, 18-2 and coupled to the first and second upholstery portions 18-1, 18-2. The first row of stitching 42 extends through the first upholstery portion 18-1, the elongated anchor 64 of the upholstery piping component 40, and the second upholstery portion 18-2, and again through the second upholstery portion 18-2 to be visible from the outside 60 of the seat cover 16. A second row of stitching 68 extends through the first upholstery portion 18-1, the elongated anchor 64 of the upholstery piping component 40, and the second upholstery portion 18-2 to fix the upholstery piping component 40 between the first and second upholstery portions 18-1, 18-2. The second row of stitching 68 is disposed between the elongated projection 66 and the first row of stitching 42.

As discussed above, the upholstery piping component 40 is flexible. Thus, it can curve, bend, fold, twist, stretch, and/or compress. The upholstery piping component 40 can therefore be moved between a neutral configuration and an energized or modified configuration. In the modified configuration, the upholstery piping component 40 may be curved, bent, folded, twisted, stretched, or compressed through the application of a force (e.g., a stitch holding the upholstery piping component 40 in place). Because of the elastic properties of the elastomeric material, the upholstery piping component 40 is biased in the neutral configuration. Therefore, absent the application of the force, the upholstery piping component 40 in the modified configuration returns to the neutral configuration.

Figure 4:
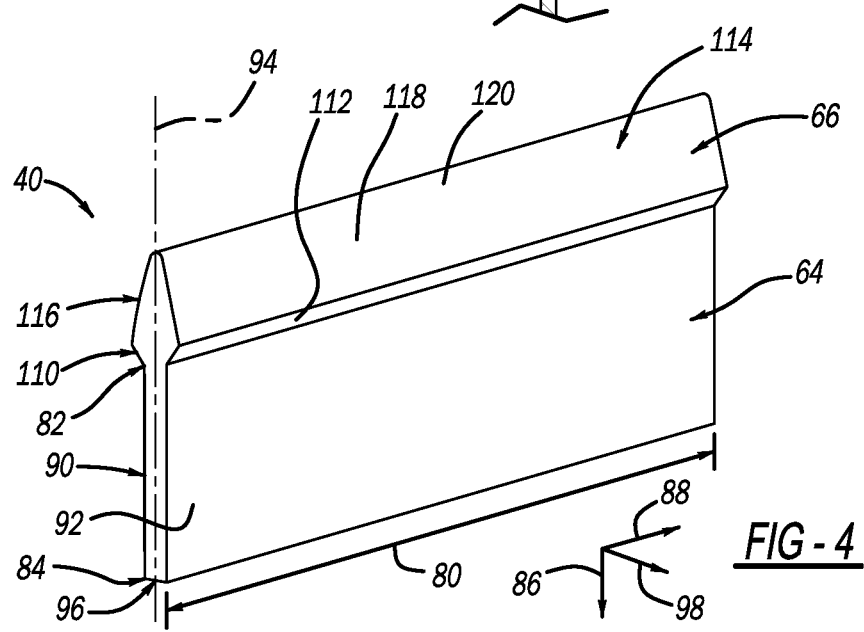
FIG. 4 is an partial isometric view of a the upholstery piping component of FIG. 3, in a neutral configuration.

Referring to FIG. 4, the upholstery piping component 40 is shown in the neutral configuration. The elongated anchor 64 extends along a length 80 and between a first end 82 and a second end 84. Thus, the elongated anchor 64 extends in a first direction 86 from the first end 82 to the second end 84 and in a second direction 88 defined by the length 80. The first direction 86 is perpendicular to the second direction 88.

The elongated anchor 64 includes a first side surface 90 and a second side surface 92 opposite the first side surface 90. The first and second side surfaces 90, 92 may extend parallel to one another. When the upholstery piping component 40 is in the neutral configuration, a center plane 94 is defined between the first side surface 90 and the second side surface 92. The center plane 94 is equidistant between the first side surface 90 and the second side surface 92. The upholstery piping component 40 may be symmetric about the center plane 94.

The elongated anchor 64 further includes a bottom or proximal surface 96 extending between the first side surface 90 and the second side surface 92 in a third direction 98. The bottom surface 96 may extend perpendicular to both the first side surface 90 and the second side surface 92. The third direction 98 is perpendicular to both the first direction 86 and the second direction 88. The elongated anchor 64 defines a rectangular cross section in the second direction 88.

The elongated projection 66 extends along the first end 82 of the elongated anchor 64 for at least a portion of the length 80, such as the entire length 80 as shown. The elongated projection 66 includes a third side surface 110 and a fourth side surface 112. The third side surface 110 extends from the first side surface 90. The fourth side surface 112 extends from the second side surface 92. The third and fourth side surface 110, 112 each extend toward the center plane 94 in the first direction 86.

The third and fourth surfaces 110, 112 are each curved. The curve is concave. As best shown in FIG. 3, the contours of the third and fourth surfaces 110, 112 may fit snugly between the first and second upholstery portions 18-1, 18-2. Moreover, the third and fourth surfaces 110, 112 may act as a depth gauge to define where to stitch the upholstery piping component 40 between the first and second upholstery portions 18-1, 18-2. Thus, when compared to traditional welting, which includes a circular (e.g., convex) cross section at the upholstery-covered cord, the upholstery piping component 40 may result in the seat cover 16 having a more uniform appearance.

The elongated projection 66 includes a top portion 114 that extends between the third side surface 110 and the fourth side surface 112. The top portion 114 is visible from the outside 60 of the seat cover 16. As will be discussed in greater detail below, the top portion 114 may define a variety of surfaces features to meet aesthetic needs of the seat cover 16 (see, e.g., FIGS. 14-16).

The top portion 114 includes a fifth side surface 116 and a sixth side surface 118. The fifth side surface 116 extends from the third side surface 110. The sixth side surface 118 extends from the fourth side surface 112. The fifth and sixth side surfaces 116, 118 each extend away from the center plane 94 in the first direction 86. The fifth and sixth side surface 116, 118 are adjacent to one another and connected at a peak 120. The elongated projection 66 defines a diamond-shaped cross section in the second direction 88.

As discussed above, the upholstery piping component 40 can be moved between the neutral configuration and the modified configuration. With reference to FIG. 5A, the upholstery piping component 40 is provided in the neutral configuration. The bottom surface 96 of the elongated anchor 64 defines a proximal end 140 of the upholstery piping component 40. The peak 120 of the elongated projection 66 defines a distal end 142 of the upholstery piping component 40. In the neutral configuration, the distal end 142 defines a first dimension or length 144.

The upholstery piping component 40 is moved from the neutral configuration to the modified configuration in response to a force in the first direction 86. The force in the first direction 86 causes the upholstery piping component 40 to curve about a first axis 146 parallel to the third direction 98. In addition to being flexible, the elastomeric material is also stretchable. Thus, when the upholstery piping component 40 is placed in the modified configuration, the elongated projection 66 may stretch.

Referring to FIG. 5B, the upholstery piping component 40 is shown in the modified configuration. In the modified configuration, the distal end 142 of upholstery piping component 40 defines a second length or dimension 148. The second dimension 148 is greater than the first dimension 144. Because the upholstery piping component 40 can be stretched, it is capable of forming the curved portion 46 having a radius of curvature of less than 60 mm at the distal end 142. In various aspects, the radius of curvature is less than 60 mm, optionally less than or equal to 55 mm, optionally less than or equal to 50 mm, and optionally less than or equal to 45 mm. The elastomeric properties therefore facilitate the formation of tighter radii than the wrapped piping described above.

In various alternative aspects, the upholstery piping component 40 can be placed into an alternative modified configuration. The upholstery piping component 40 is moved from the neutral configuration to the alternative modified configuration in response to a force applied in the third direction 98. In the alternative modified configuration, the upholstery piping component 40 is curved about a second axis 150 parallel to the first direction 86.

For certain seams, such as those disposed on the shoulder portion 24 of the seat 10 (FIG. 1), smaller radii of curvature than those described above may be desirable. Upholstery piping components can optionally be molded (e.g., injection molded) to facilitate the formation of tighter curves in the modified configuration. In one example, notches, similar to the notches that are manually cut into the typical wrapped piping, are molded directly into the anchor portion (FIGS. 6A-6B). In another example, curved portions are molded directly into the upholstery piping component as required by the particular vehicle seat 10 (FIG. 7).

Referring to FIGS. 6A-6B, another upholstery piping component 160 according to certain aspects of the present disclosure is provided. The upholstery piping component 160 is formed from or includes an elastomeric material, as described above. The upholstery piping component 160 includes an elongated anchor 162 extending along a length 164 and an elongated projection 166 extending along at least a portion of the length 164. The upholstery piping component 160 can be moved between a neutral configuration (FIG. 6A) and a modified configuration (FIG. 6B). In the neutral configuration, the upholstery piping component 160 defines a first direction 168, a second direction 170, and a third direction (not shown), similar to the first direction 86, the second direction 88, and the third direction 98 of FIGS. 2-5B. The elongated anchor 162 defines a bottom surface 172 similar to the bottom surface 96 of the upholstery piping component 40 of FIGS. 2-5B. Except as described below, the upholstery piping component 160 is similar to the upholstery piping component 40 of FIGS. 2-5B.

The bottom surface 172 defines a plurality of notches 174. Each notch 174 extends from the bottom surface 172 toward the elongated projection 166 (i.e., toward a first end of the elongated anchor 162). Each notch is further extends between a first side surface 176 of the elongated anchor 162 and a second side surface (not shown) of the elongated anchor 162 opposite the first side surface 176. Each notch 174 may define a triangular cross section in the third direction.

The plurality of notches 174 allows the upholstery piping component 160 to be placed into a modified configuration to define a curved portion 178. The curved portion 178 is capable of forming a tighter radius than the curved portion 46 of the upholstery piping component 40 of FIGS. 2-5B because the notches 174 reduce or eliminate puckering of the elongated anchor 164. As the upholstery piping component 160 is moved into the modified configuration, a volume 180 of each notch 174 decreases. In various aspects, the volume 180 of each notch 174 may approach zero as the curved portion approaches a minimum radius of curvature.

The plurality of notches 174 may be molded into the elongated anchor 162. Thus, the upholstery piping component 160 including the notches 174 can be formed in a single operation, unlike the notches that are manually cut into the wrapped piping. Forming the notches 174 during the molding operation can result in quicker production times and greater uniformity between notches 174 and upholstery piping components 160.

With reference to FIG. 7, yet another upholstery piping component 190 according to certain aspects of the present disclosure is provided. The upholstery piping component 190 has pre-molded curves according to the seat geometry (i.e., the surface trim outline (STO)). The upholstery piping component 190 is formed from or includes an elastomeric material, as described above. The upholstery piping component 190 includes an elongated anchor 192 and an elongated projection 194. The upholstery piping component 190 includes a curved portion 196. The curved portion 196 includes an inside arc 198 at a proximal end 200 of the upholstery piping component 190 and an outside arc 202 at a distal end 204 of the upholstery piping component 190.

The inside arc 198 defines a first length or dimension 206 and the outside arc 202 defines a second length or dimension 208. The first dimension 206 is less than the second dimension 208. The inside arc 198 defines a continuous surface 210 that is free of joints or seams (unlike the upholstery piping component 160 of FIG. 6B).

Unlike the upholstery piping components 40 and 160 of FIGS. 2-5B and 6A-6B, respectively, the upholstery piping component 190 includes the curved portion 196 in a neutral configuration without the application of any outside force. The upholstery piping component 190 can be manufactured in a molding process to include curves as required by the vehicle seat 10 (FIG. 1). The upholstery piping component 190 may also include straight portions and additional curved portions (not shown). Although the curved portion 196 is molded into the upholstery piping component 190, additional curved portions (not shown) can be achieved through a manual application of force (see, e.g., FIGS. 5A-5B) and/or a plurality of notches (see, e.g., FIGS. 6A-6B).

Elastomeric upholstery piping components may define a variety of cross sectional shapes in the second direction (perpendicular to a length). Elongated projections may include planar surfaces (see, e.g., FIG. 9), curved surfaces (see, e.g., FIG. 10), or a combination of planar surfaces and curved surfaces. Elongated projections may be symmetric (see, e.g., FIGS. 4A-11, 13) or asymmetric (FIG. 12) about a center plane defined by an elongated anchor. In various aspects, the upholstery piping component may include multiple elongated projections (e.g., to have an appearance of double welting). In other aspects, an elongated projection may extend along only a portion (or portions) of a length of the elongated anchor, so that when the upholstery piping component is coupled to a seat cover, the elongated projection appears and disappears. In still other aspects, a lighter-weight upholstery piping component may include an elongated projection that defines an elongated hollow portion.

Referring to FIG. 8, an upholstery piping component 220 according to certain aspects of the present disclosure is provided. The upholstery piping component 220 may have a generally T-shaped cross section in a direction perpendicular to its length. The upholstery piping component 220 includes an elongated anchor 222 and an elongated projection 224. The elongated anchor 222 includes a first side surface 226 and a second side surface 228, similar to the elongated anchor 64 of the upholstery piping component 40 of FIGS. 2-5B.

The elongated projection 224 includes a third side surface 230 extending from the first side surface 226 and a fourth side surface 232 extending from the second side surface 228. The third and fourth side surfaces 230, 232 are curved and concave. The third and fourth side surfaces 230, 232 each extend toward a center plane 234 in a direction 236 (similar to the first direction 86 of the upholstery piping component 40 of FIGS. 2-5B).

The elongated projection 224 further includes a top portion 238. The top portion 238 includes a fifth side surface 240 extending from the third side surface 230, a sixth side surface 242 extending from the fourth side surface 232, and a top surface 244 extending between the fifth side surface 240 and the sixth side surface 242. The fifth and sixth side surfaces 240, 242 extend parallel to one another. The top surface 244 is convex. However, in various alternative embodiments, the top surface 244 may be planar when the upholstery piping component 220 is in a neutral state. The elongated projection 224 defines a height 246 that is less than a width 248.

With reference to FIG. 9, another upholstery piping component 260 according to certain aspects of the present disclosure is provided. The upholstery piping component 260 includes an elongated anchor 262 and an elongated projection 264. The elongated anchor 262 includes a first side surface 266 and a second side surface 268 and may be similar to the elongated anchor 64 of the upholstery piping component 40 of FIGS. 2-5B.

The elongated projection 264 includes a third side surface 270 extending from the first side surface 266 and a fourth side surface 272 extending from the second side surface 268. The third and fourth side surfaces 270, 272 each extend toward a center plane 274 in a direction 276 (similar to the first direction 86 of the upholstery piping component 40 of FIGS. 2-5B). The third and fourth side surfaces 270, 272 may each be planar. The third side surface 270 and the first side surface 266 define a first angle 278. The fourth side surface 272 and the second side surface 268 define a second angle 280. The first and second angles 278, 280 may each be greater than or equal to 90° and less than or equal to 180°, optionally greater than or equal to 110° and less than or equal to 160°, and optionally greater than or equal to 120° and less than or equal to 150°. The first and second angles 278, 280 have the same magnitudes. However, in alternative aspects, the first and second angles 278, 280 may have different magnitudes.

The elongated projection 264 further includes a top portion 282. The top portion 282 includes a fifth side surface 284 extending from the third side surface 270, a sixth side surface 286 extending from the fourth side surface 272, and a top surface 288 extending between the fifth side surface 284 and the sixth side surface 286. The fifth side surface 284, the sixth side surface 286, and the top surface 288 may each be planar. The fifth and sixth side surfaces 284, 286 extend away from the center plane 274 in the first direction 276. The top surface 288 extends parallel to a bottom surface 290 of the elongated anchor 262. The upholstery piping component 260 is symmetric about the center plane 274. The elongated projection 264 defines a height 292 that is greater than a width 294.

Referring to FIG. 10, yet another upholstery piping component 310 according to certain aspects of the present disclosure is provided. The upholstery piping component 310 includes an elongated anchor 312 and an elongated projection 314. The upholstery piping component 310 may be similar to the upholstery piping component 260 of FIG. 9.

With reference to FIG. 11, yet another upholstery piping component 330 according to certain aspects of the present disclosure is provided. The upholstery piping component 330 includes an elongated anchor 332 and an elongated projection 334. The elongated anchor 332 includes a first side surface 336 and a second side surface 338, and may be similar to the elongated anchor 64 of the upholstery piping component 40 of FIGS. 2-5B.

The elongated projection 334 includes a third side surface 340 extending from the first side surface 336 and a fourth side surface 342 extending from the second side surface 338. The third and fourth surfaces 340, 342 each extend toward a center plane 344 in a direction 346 (similar to the first direction 86 of the upholstery piping component 40 of FIGS. 2-5B).

The elongated projection 334 further includes a top portion 348 having a top surface 350. The top surface 350 extends between the third side surface 340 and the fourth side surface 342. The top surface 350 is convex. A height 352 of the elongated projection 334 may be less than a width 354 of the elongated projection 334. The upholstery piping component 330 may be symmetric about the center plane 344.

Figure 12:
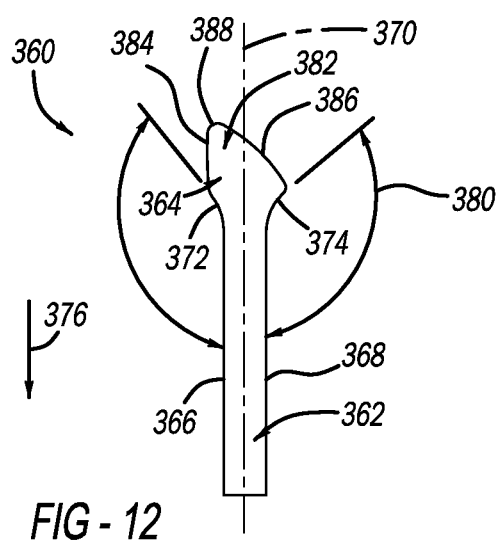

Referring to FIG. 12, yet another upholstery piping component 360 according to certain aspects of the present disclosure is provided. The upholstery piping component 360 includes an elongated anchor 362 and an elongated projection 364. The elongated anchor 362 includes a first side surface 366 and a second side surface 368 and may be similar to the elongated anchor 64 of the upholstery piping component 40 of FIGS. 2-5B. A center plane 370 is defined between the first side surface 366 and the second side surface 368.

The elongated projection 364 is asymmetric about the center plane 370. The elongated projection 364 includes a third side surface 372 extending from the first side surface 366 and a fourth side surface 374 extending from the second side surface 368. The third and fourth side surfaces 372, 374 extend toward the center plane 370 in a direction 376 (similar to the first direction 86 of the upholstery piping component 40 of FIGS. 2-5B).

The third side surface 372 and the first side surface 366 define a first angle 378. The fourth side surface 374 and the second side surface 368 form a second angle 380. The first and second angles 378, 380 are distinct. The third and fourth side surfaces 372, 374 also have distinct dimensions.

The elongated projection 364 further includes a top portion 382. The top portion 382 includes a fifth side surface 384 extending from the third side surface 372 and a sixth side surface 386 extending from the fourth side surface 374. The fifth and sixth side surfaces 384, 386 are connected by a peak 388. The peak 388 is not aligned with the center plane 370.

Figure 13:
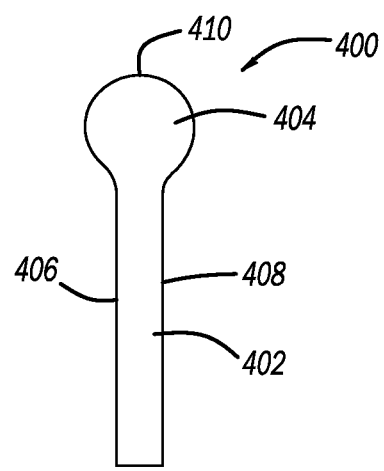

With reference to FIG. 13, yet another upholstery piping component 400 according to certain aspects of the present disclosure is provided. The upholstery piping component 400 includes an elongated anchor 402 and an elongated projection 404. The elongated anchor 402 includes a first side surface 406 and a second side surface 408, and may be similar to the elongated anchor 64 of the upholstery piping component 40 of FIGS. 2-5B.

The elongated projection 404 includes a projection surface 410 that extends from the first side surface 406 to the second side surface 408. The projection surface 410 is a continuous, convex, curved surface. A cross section of the elongated projection 404 perpendicular to a length of the upholstery piping component 400 may be circular. Thus, the cross section may be similar to the cross section of the wrapped piping described above.

As discussed above, an upholstery piping component includes a top portion that is visible from outside of a seat cover. The top portion may include a smooth surface, or alternatively, a textured surface. The textured surface may include scoring, cross hatching (FIG. 15), knurling (FIG. 14), dimpling (FIG. 16), swirls, spiraling, twisting, or combinations thereof by way of non-limiting example. The textured surface may include raised portions, depressed portions, or a combination of raised portions and depressed portions.

Figure 14:
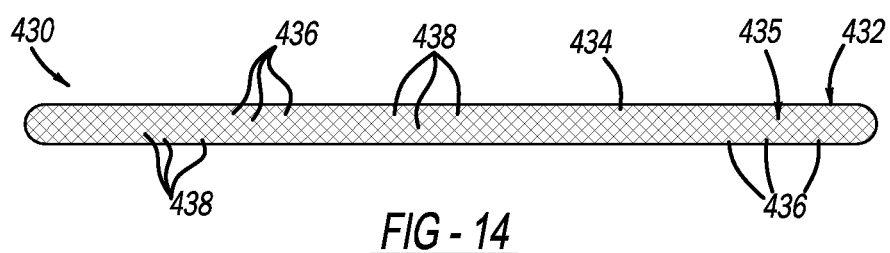
FIGS. 14-16 are top views of alternative upholstery piping components, according to certain aspects of the present disclosure, each upholstery piping component having a different surface texture.

Referring to FIG. 14, an upholstery piping component 430 according to certain aspects of the present disclosure is provided. The upholstery piping component 430 includes a top portion 432 having a surface 434. The surface 434 defines a knurling pattern 435 including diamond-shaped protrusions 436 and cross-hatched depressions 438. While the pattern is referred to as knurling, it is not necessarily formed in a traditional knurling process. Rather, it may be formed in a molding process used to form the upholstery piping component 430.

Figure 15:
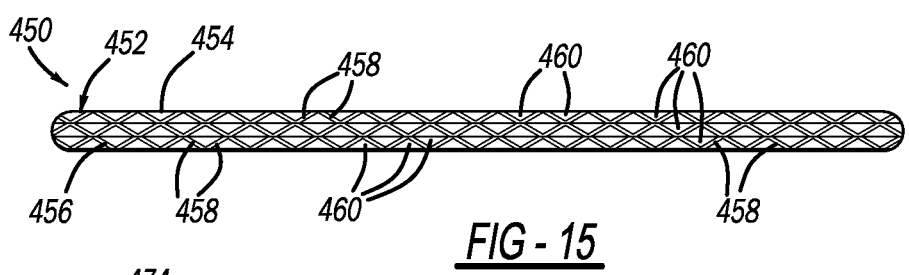

With reference to FIG. 15, another upholstery piping component 450 according to certain aspects of the present disclosure is provided. The upholstery piping component 450 includes a top portion 452 having a surface 454. The surface 454 defines a cross hatching pattern 456. The cross hatching pattern 456 may include raised portions 458 and triangular depressions 460.

Figure 16:
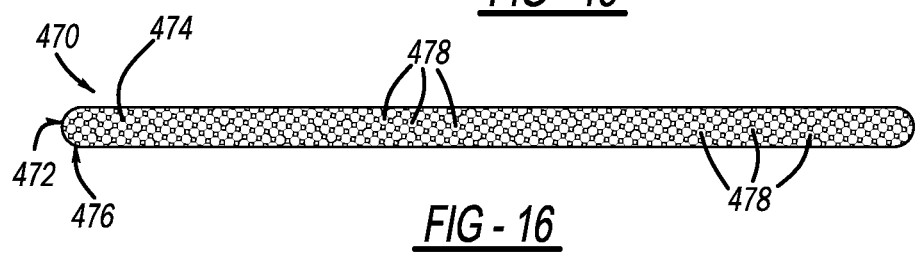

Referring to FIG. 16, yet another upholstery piping component 470 according to certain aspects of the present disclosure is provided. The upholstery piping component 470 includes a top portion 472 having a surface 474. The surface 474 defines a dimpling pattern 476. The dimpling pattern 476 may include plurality of depressed, circular dimples 478.

In various aspects, the present disclosure provides a method of manufacturing an elastomeric upholstery piping component. The elastomeric piping component can be manufactured in an extrusion process or a molding process (e.g., injection molding). The elastomeric piping component can be manufactured in an extrusion process when its cross section perpendicular to its length is uniform across the length. By way of non-limiting examples, the upholstery piping component of FIGS. 2-5B can be manufactured in an extrusion process. Upholstery piping components have more complex geometries or non-uniform cross sections can be manufactured in a molding operation, such as injection molding. The upholstery piping component manufactured in an injection molding process can include notches (FIGS. 6A-6B), neutral-configuration curved portions (FIG. 7), and surface textures (FIGS. 14-16).

Although the elastomeric upholstery piping component is described in the context of automobile seats, it can also be used on seats in other applications, such as other vehicle applications (e.g., motorcycles and recreational vehicles), in the aerospace industry (e.g., airplanes, helicopters, drones), nautical applications (e.g., ships, personal watercraft, docks), agricultural equipment, industrial equipment, and the like. The elastomeric upholstery piping component can also be in non-vehicle applications, such as household or office furniture and seats that must stand up to frequent use (e.g., in waiting rooms, classrooms, or airports). Finally, the elastomeric piping can be used in non-seating applications, such as for any soft-wrapped trim operation. Other soft-wrapped trim operations in a vehicle include instrument panels and doors, by way of non-limiting example.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A seat cover for a vehicle seat, the seat cover comprising:
    an upholstery component including a first portion and a second portion; and
    an upholstery piping component coupled to the first portion and the second portion and disposed between the first portion and the second portion, the upholstery piping component being formed from an elastomeric material and including,
        an elongated anchor extending in a first direction between a first end and a second end and in a second direction defining a length, the elongated anchor including a first side surface and a second side surface disposed opposite the first side surface, each of the first side surface and the second side surface extending between the first end and the second end along the length, and
        an elongated projection integrally formed with the elongated anchor, the elongated projection extending from the first end of the elongated anchor for at least a portion of the length, the elongated projection including a third side surface extending from the first side surface, a fourth side surface extending from the second side surface, a fifth side surface extending from the third side surface, and a sixth side surface extending from the fourth side surface, wherein the elongated projection at least partially conceals a seam between the first portion of the upholstery component and the second portion of the upholstery component when the seat cover is coupled to the vehicle seat, wherein:
    the third side surface is planar and the fourth side surface is planar;
    the first side surface and the third side surface define a first angle;
    the second side surface and the fourth side surface define a second angle; and
    the first angle and the second angle are each greater than 120° and less than 150°.

2. An upholstery piping component for a seat of a vehicle, the upholstery piping component comprising:
    an elongated anchor formed from an elastomeric material and extending in a first direction between a first end and a second end and in a second direction defining a length, the elongated anchor including a first side surface and a second side surface disposed opposite the first side surface, each of the first side surface and the second side surface extending between the first end and the second end along the length, the elongated anchor being configured to be coupled to a first upholstery portion and a second upholstery portion and disposed between the first upholstery portion and the second upholstery portion; and
    an elongated projection formed from the elastomeric material and integrally formed with the elongated anchor, the elongated projection extending from the first end of the elongated anchor for at least a portion of the length, the elongated projection including a third side surface extending from the first side surface, a fourth side surface extending from the second side surface, a fifth side surface extending from the third side surface, and a sixth side surface extending from the fourth side surface, the elongated projection being configured to at least partially conceal a seam between the first upholstery portion and the second upholstery portion, wherein the elastomeric material is flexible such that the upholstery piping component is configured to move between a neutral configuration and a modified configuration and the second direction is perpendicular to the first direction when the upholstery piping component is in the neutral configuration, wherein:
    the third side surface is planar and the fourth side surface is planar;
    the first side surface and the third side surface define a first angle;
    the second side surface and the fourth side surface define a second angle; and
    the first angle and the second angle are each greater than 120° and less than 150°.

3. The upholstery piping component of claim 2 wherein the upholstery piping component is configured to move from the neutral configuration to the modified configuration in response to a force applied in the first direction.

4. The upholstery piping component of claim 3 wherein the elongated projection is configured to stretch from a first dimension to a second dimension greater than the first dimension when the upholstery piping component moves from the neutral configuration to the modified configuration.

5. The upholstery piping component of claim 3 wherein:
    the elongated anchor defines a proximal surface disposed at the second end, the proximal surface extending in the second direction and in a third direction perpendicular to the first direction and the second direction when the upholstery piping component is in the neutral configuration;
    the proximal surface defines a plurality of notches extending toward the first end of the elongated anchor; and
    a volume of each notch is configured to decrease when the upholstery piping component moves from the neutral configuration to the modified configuration.

6. The upholstery piping component of claim 5 wherein each notch of the plurality of notches defines a triangular cross section in the third direction.

7. The upholstery piping component of claim 2 wherein in the neutral configuration, the upholstery piping component is symmetric about a center plane equidistant between the first side surface and the second side surface when the upholstery piping component is in the neutral configuration.

8. The upholstery piping component of claim 2 wherein in the modified configuration, the upholstery piping component defines a radius of curvature of less than 60 mm.

9. The upholstery piping component of claim 8 wherein the radius of curvature is less than or equal to 40 mm.

10. The upholstery piping component of claim 2 wherein the elongated projection includes a top surface defining a texture.

11. The upholstery piping component of claim 2 wherein the elongated projection extends along the entire length of the elongated anchor.

12. The upholstery piping component of claim 2 wherein the elongated projection extends along only a portion of the length.

13. The upholstery piping component of claim 2 wherein the fifth side surface and the sixth side surface are parallel to one another.

14. The upholstery piping component of claim 2 wherein the elongated projection defines a diamond-shaped cross section in the second direction.

15. The upholstery piping component of claim 2 wherein the elongated projection is asymmetric about a center plane equidistant between the first side surface and the second side surface when the upholstery piping component is in the neutral configuration.

* * * * *